United States Patent [19]

Kogan

[11] Patent Number: 5,397,559
[45] Date of Patent: Mar. 14, 1995

[54] METHOD FOR THE SEPARATE RECOVERY OF A HIGH MOLECULAR WEIGHT GAS AND A LOW MOLECULAR WEIGHT GAS FROM A GASEOUS STARTING MIXTURE

[75] Inventor: Abraham Kogan, Menashe, Israel

[73] Assignee: Yeda Research and Development Company Limited, Rehovot, Israel

[21] Appl. No.: 68,398

[22] Filed: May 28, 1993

[30] Foreign Application Priority Data

Jun. 1, 1992 [IL] Israel .................. 102064

[51] Int. Cl.[6] ............... C01B 3/04; C01B 13/02
[52] U.S. Cl. ................... 423/579; 423/580.1; 423/658.2
[58] Field of Search ............. 423/210, 579, 580.1, 423/658.2

[56] References Cited

U.S. PATENT DOCUMENTS

| | | | |
|---|---|---|---|
| 4,053,576 | 10/1977 | Fletcher | 423/579 |
| 4,233,127 | 11/1980 | Monahan | 204/157.1 R |
| 4,476,105 | 10/1984 | Greenbaum | 423/648 R |
| 4,595,568 | 6/1986 | Van Damme et al. | 422/186 |
| 5,069,686 | 12/1991 | Baker | |

FOREIGN PATENT DOCUMENTS 366216  4/1978  France .
1532403 11/1978  United Kingdom .

*Primary Examiner*—Wayne Langel
*Attorney, Agent, or Firm*—Helfgott & Karas

[57] ABSTRACT

Separate recovery of high and low molecular weight gases from a gaseous starting mixture, e.g. a mixture resulting from thermal water splitting. A set of three chambers is used which are arranged in series and separated by membranes permeable preferentially to the low molecular gas. Gases permeate from the first to the second chamber and from there to the third chamber. A gaseous mixture enriched with the high molecular weight gas is withdrawn from the first chamber and a gaseous mixture enriched with the low molecular weight gas is withdrawn from the third chamber. Undesired gaseous components are rendered non-gaseous and the remaining low and high molecular weight gases are withdrawn separately.

11 Claims, 6 Drawing Sheets

METHOD FOR THE SEPARATE RECOVERY OF A HIGH MOLECULAR WEIGHT GAS AND A LOW MOLECULAR WEIGHT GAS FROM A GASEOUS STARTING MIXTURE

FIELD OF THE INVENTION

This invention relates to a method of and apparatus for the separate recovery of gases with different molecular weights from a gas mixture. A typical application of the method according to the invention is the recovery of hydrogen and/or oxygen from a hot oxygen/hydrogen mixture obtained by direct thermal splitting of water, and in the following the invention will be described specifically with reference to that particular case, it being understood that it is not limited thereto.

BACKGROUND OF THE INVENTION

The development of hydrogen as an energy vector has been the subject of major research efforts for several decades. Interest in this field intensified in recent years because of the possibility that hydrogen could provide a source of renewable and entirely non-polluting energy for mankind, thus releasing it from dependence on fossil fuels and the ensuing environmental effects (the greenhouse effect, for example). For a general review of the subject see I. Dostrovsky, Energy and the Missing Resource, Cambridge University Press, (1988), while for a specific review of the use of hydrogen as an energy vector see C. J. Winter and J. Nitsch, Wasserstoff als Energietrager, Springer-Verlag (1986).

A very promising method of production of hydrogen by renewable energy consists of the dissociation of water by concentrated solar radiation. It is well known that at a sufficiently high temperature water will spontaneously decompose into its constituents. The temperatures required are high, well above 2000 degrees centigrade, but are readily achieved through concentrated solar radiation and it can be shown that at such high temperature water vapor decomposes to yield a gaseous mixture with an appreciable proportion of hydrogen. However, the separate recovery of hydrogen and oxygen from such gaseous mixtures raises some problems.

The methods of separation of a gas mixture which found wide application in isotope separation, such as gas centrifugation, thermal diffusion and mass diffusion (S. Villani, Isotope Separation, ANS (1976)), are clearly not suitable in their known configurations for separation of individual components from the very hot gas mixture formed in the process of direct splitting of water.

A method for separation of the hot products of water splitting that has been proposed in the technical literature (E. A. Fletcher and R. L. Moen, Science, 197:1050 (1977)) is gas diffusion through a porous wall under a Knudsen flow regime. The gas flow through the porous wall is defined as a Knudsen flow if the pressure in the gas is sufficiently low, so as to maintain the molecular mean free path in the gas larger than the wall mean pore size (S. Villani, Isotope Separation, ANS (1976)).

When part of the water dissociation products formed in a hot reactor are extracted from the reactor by diffusion through a porous wall under Knudsen flow conditions, while the remaining dissociation products bypass the porous wall on their way out of the reactor, the gas stream that diffuses through the porous wall is enriched in light gas components while the bypassing stream is depleted of light gas components.

It should be noted that when leaving the reactor, both streams are at a very high temperature. In order to obtain a high yield of hydrogen for a given amount of solar radiation (i.e. high hydrogen production efficiency) it is necessary to recover as much as possible of the thermal energy contained in these hot gas streams. A process has been proposed (unpublished) in which water is heated to a high temperature in a reactor chamber whose walls include two membranes. One membrane is a porous ceramic wall which under appropriate flow conditions, it is preferentially permeable to hydrogen. The other membrane is a solid-oxide membrane, such as an yttria stabilized zirconia membrane of the kind used in fuel cells, through which oxygen can pass preferentially by ionic conductance (J. E. Noring et al., Energy, 6: 109.(1981)). In accordance with that process, part of the hot products of water dissociation is extracted from the reactor by diffusion through the preferentially hydrogen permeable membrane and another part is extracted by diffusion through the membrane permeable to oxygen. The remaining dissociation products bypass the two membranes on their way out of the reactor and are recirculated to the reactor by some pumping means, such as a steam injector actuated by high pressure make up steam, and in this way the sensible heat carried by the recirculated products is recovered.

The solid oxide membranes used in this process have a high ionic resistance and consequently a very low oxygen permeability, which constitutes a serious drawback of the process. Moreover, in order to obtain efficient gas separation by diffusion through a porous wall, the pore size must be at most of the order of magnitude of the molecular mean free path of the gas mixture. This requirement places a limitation on the maximum gas pressure inside the chamber containing the gas separation membrane, which is yet another drawback. By way of example, assuming a pore diameter of the order of 15 microns and a gas temperature of 2500 K, the solar reactor chamber pressure should preferable be below 0.04 atm.

A primary object of the present invention is to provide an effective method for the separate recovery of gases of different molecular weight from gas mixture by gas diffusion.

Another object of the invention is to provide a method for the separate recovery of hydrogen and/or oxygen from a gas mixture resulting from direct thermal splitting of water, without recourse to preferentially oxygen permeable membranes.

It is yet another object of the invention to provide a method of the kind specified with an improved heat regime.

SUMMARY OF THE INVENTION

In accordance with the present invention there is provided a method for the separate recovery of a high molecular weight gas and a low molecular weight gas from a gaseous starting mixture in which they are contained, comprising:
(i) providing first, second and third chambers arranged in series and separated from each other by membranes permeable preferentially to the low molecular weight gas;
(ii) charging said first chamber with said gaseous starting mixture;

(iii) withdrawing from said first chamber a first product gaseous mixture enriched with said high molecular weight gas;

(iv) withdrawing from said second chamber a second product gaseous mixture and recycling it into said first chamber;

(v) withdrawing from said third chamber a third product gaseous mixture enriched with said low molecular weight gas;

(vi) subjecting said first and third product gaseous mixtures separately to treatment by which undesired gaseous components are rendered non-gaseous; and (vii) separately recovering the remaining low molecular and high molecular weight gases.

The gaseous starting mixture may be introduced as is into the first chamber or else be formed therein in situ.

The invention thus stipulates, i.a., the use of two membranes permeable preferentially to the low molecular weight gas, arranged in series and spaced from each other.

The terms "high" and "low" used herein in relation to the molecular weight of the gases that are to be separated, are meant in the relative and merely signify that the two gases are of different molecular weights.

The treatment of said first and third product gaseous mixture by which undesired gaseous components are rendered non-gaseous, i.e. are liquified or solidified, e.g. frozen, may be an ordinary condensation process. Alternatively or in addition, it is possible in a first step to subject either or both of said first and third product gaseous mixtures to conditions at which a chemical reaction takes place which leads to a condensed product.

The method according to the invention may be carried out batchwise or continuously. In its batch mode the operation is continued until the second product gaseous mixture that is being recycled to the first chamber has been so much depleted of the two desired high and low molecular weight gases that no more appreciable amounts of these gases are recoverable.

In the continuous mode fresh gaseous starting mixture will be fed into the first chamber at a rate at which the product high and low molecular weight gases are withdrawn. If desired, in this mode of operation the starting gaseous mixture may entrain the second product gaseous mixture back into the first chamber, e.g. by means of a mixing injection nozzle, whereby heat is recovered.

In practicing the continuous mode it is possible, if desired, to perform inside the first chamber a reaction by which the desired high and low molecular weight gases are formed in situ, e.g. a thermal decomposition reaction.

The method according to the invention is in particular suitable for an operation in which the said first chamber serves as a reaction chamber for the direct thermal splitting of water to yield a gaseous mixture that contains oxygen and hydrogen, which are then separated.

The present invention thus provides a method of direct thermal splitting of water and separate recovery of hydrogen and/or oxygen from the resulting hot gaseous decomposition mixture, comprising:

(i) providing first, second and third chambers arranged in series and separated from each other by membranes that are permeable preferentially to hydrogen in a Knudsen flow regime;

(ii) feeding water into said first chamber and inducing a direct thermal splitting of water to occur therein;

(iii) withdrawing from said first chamber a first product gaseous mixture enriched in oxygen;

(iv) withdrawing from said second chamber a second product gaseous mixture and recycling such mixture to said first chamber together with feed water;

(v) withdrawing from said third chamber a third gaseous product mixture enriched in hydrogen;

(vi) allowing the said first and third product gaseous mixtures to cool down sufficiently to enable in each of them the combination of hydrogen and oxygen into water, inducing such combination to occur and withdrawing water from the resulting oxygen/water and hydrogen/water mixtures; and (vii) separately recovering oxygen and hydrogen.

By recycling the second gaseous product mixture withdrawn from the second chamber to the first chamber, a significant amount of heat is returned into the first chamber. Additional amounts of heat may be recovered by subjecting the oxygen/water mixture obtained from the first gaseous product mixture and the hydrogen/water mixture obtained from the third gaseous product mixture to heat exchange with feed water, before the removal of water from these mixtures and the separate recovery of oxygen and hydrogen therefrom. By such heat recovery the thermal efficiency of the overall process is further improved.

The heat required for the thermal splitting of water in the first chamber can be derived from any desired source. In accordance with one embodiment concentrated solar energy is used which is admitted into the reactor through a suitable window or aperture to furnish inside the reaction chamber temperatures of above 2000° K.

The invention further provides an apparatus for direct thermal splitting of water and separately recovering oxygen and hydrogen from the resulting hot gaseous splitting mixture, comprising:

(i) a first chamber with heating means, feed water ingress means and means for the withdrawal of a first product gaseous mixture;

(ii) means for the delivery of feed water to said first chamber;

(iii) a second chamber separated from the first chamber by a membrane permeable preferentially to hydrogen in a Knudsen flow regime, fitted with means for the withdrawal of a second product gaseous mixture;

(iv) means for recycling the withdrawn second product gaseous mixture to said first chamber;

(v) a third chamber separated from said second chamber by a membrane preferentially to hydrogen in a Knudsen flow regime fitted with means for the withdrawal of a third product gaseous mixture;

(vi) means for cooling each of said first and third product gaseous mixtures;

(vii) means for inducing catalytic combination of hydrogen and oxygen in said first and third product gaseous mixtures to yield separately an oxygen/water mixture and a hydrogen/water mixture;

(viii) means for the removal of water from each of said oxygen/water and hydrogen/water mixtures; and (ix) means for a separate withdrawal of oxygen and hydrogen.

In a preferred embodiment of the invention said first chamber is designed for heating by means of concentrated solar energy. To this end the heating means of the chamber comprise an aperture for the admission of concentrated solar energy, which aperture may be sealed by a suitable window.

If desired, heat exchanger means may be provided for the transfer of heat from the oxygen/water and hydrogen/water mixture to the feed water or to another fluid.

DESCRIPTION OF THE DRAWINGS

For better understanding the invention will now be described, by way of example only, with reference to the annexed drawings which all concern the specific case of the separate recovery of hydrogen and/or oxygen from a gaseous mixture resulting from the thermal splitting of water by means of concentrated solar energy, it being understood that the invention is not limited thereto.

BRIEF DESCRIPTION OF DRAWINGS

Figure 1:
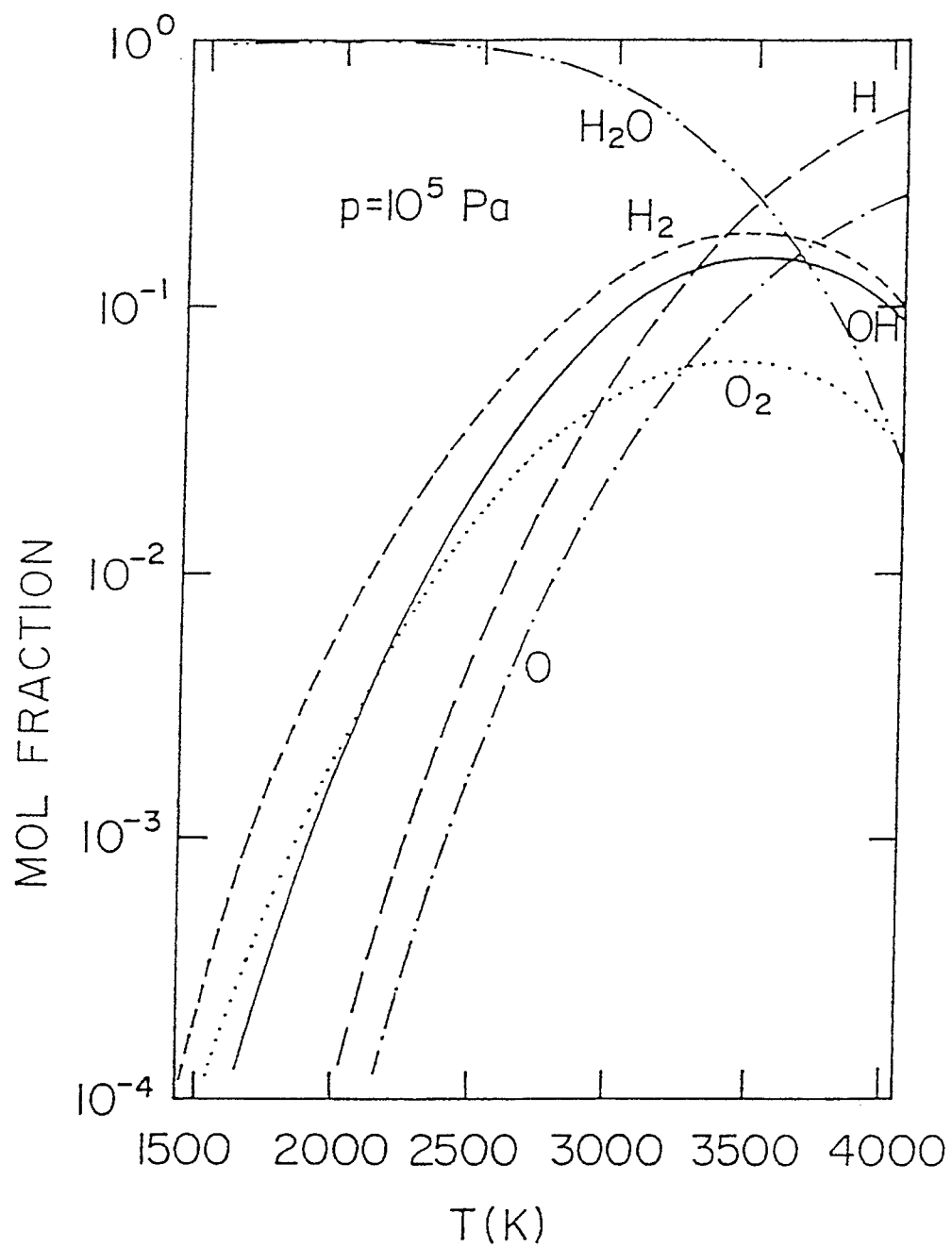
Figure 2:
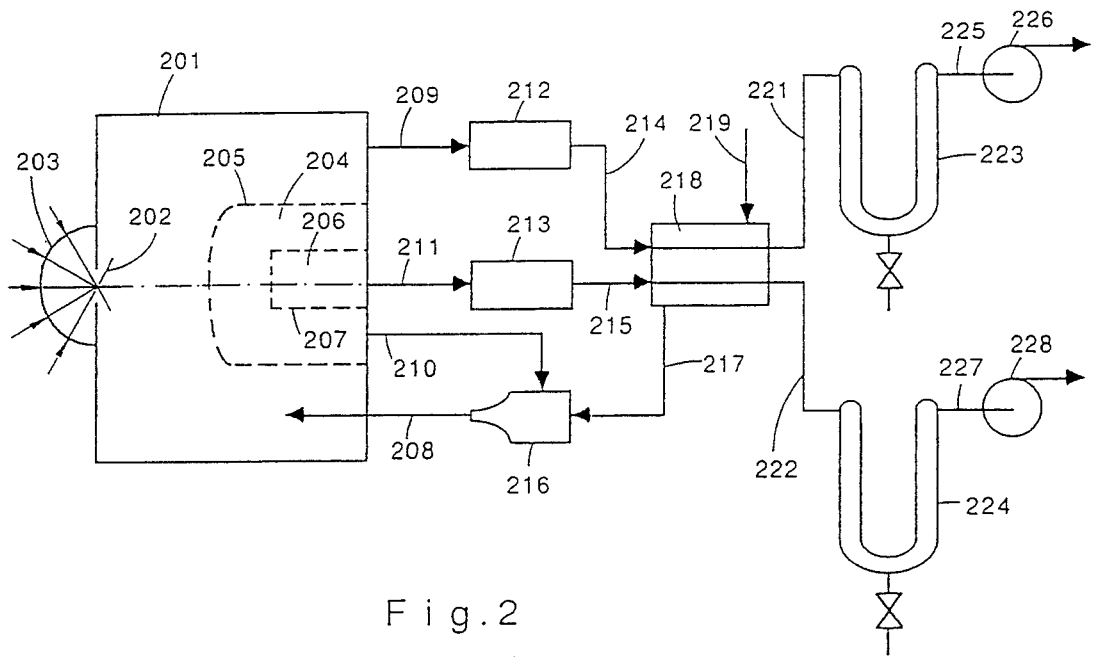
Figure 6:
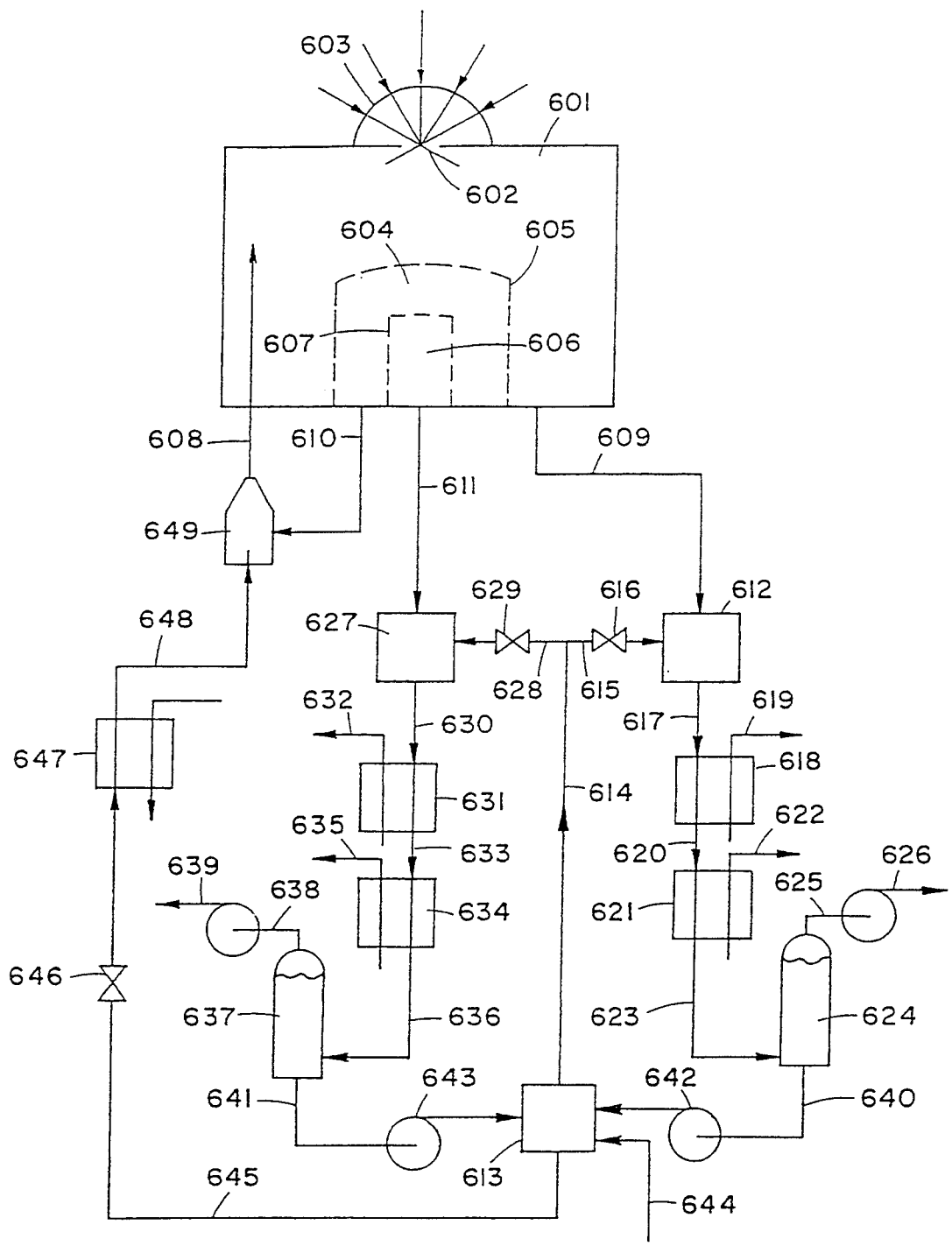
Figure 7:
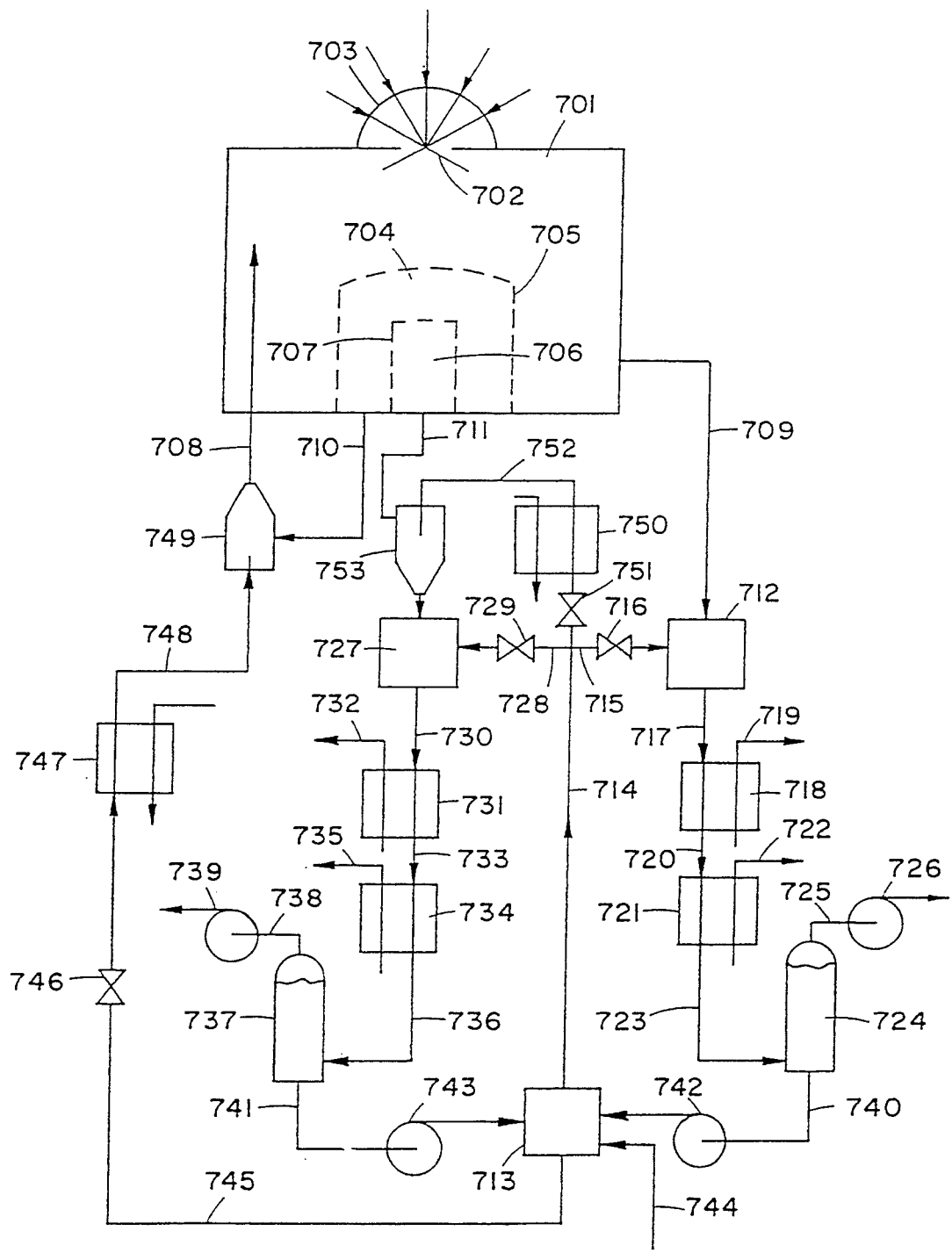
Figure 8:
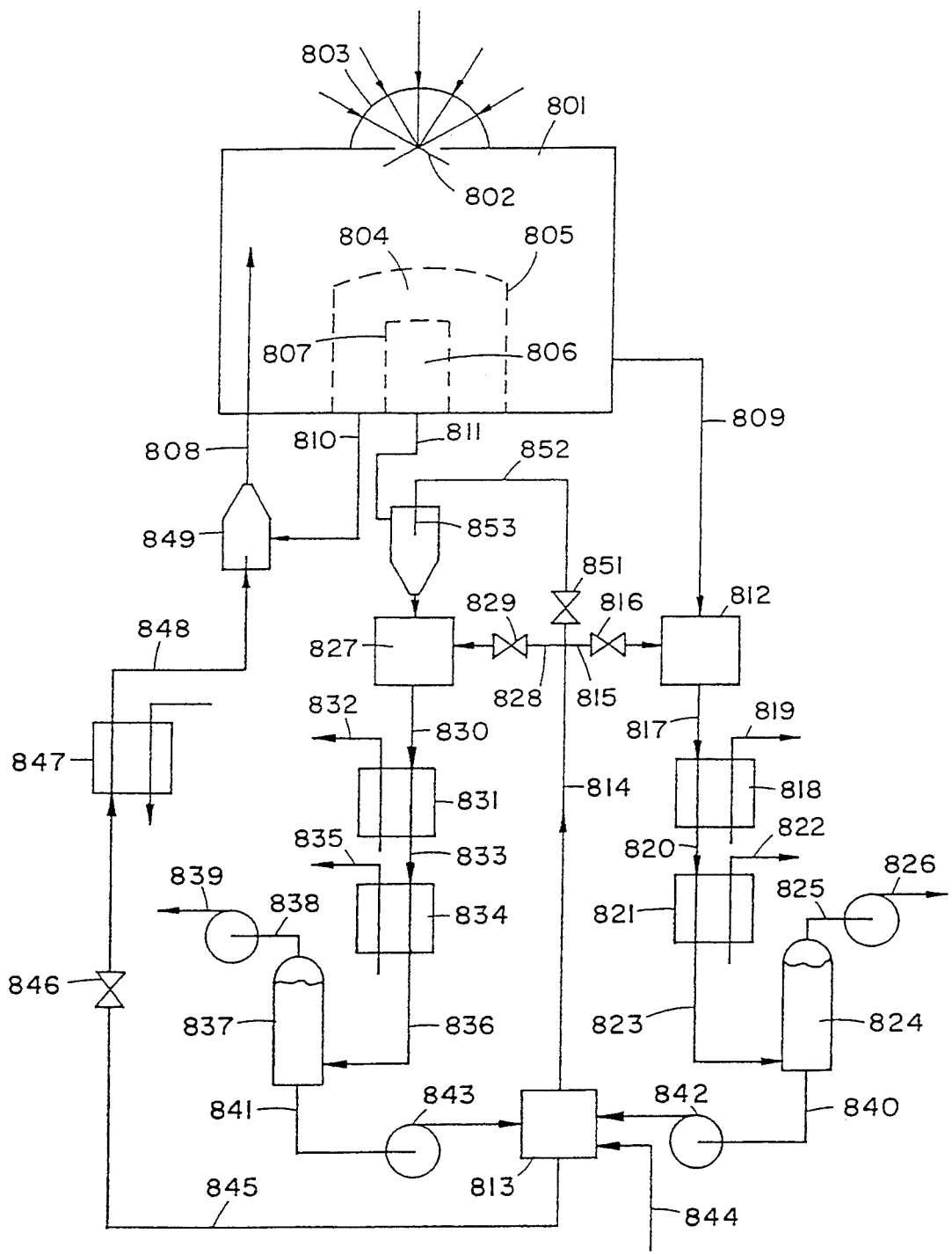

FIG. 1 is a graphic diagram showing the mol fraction of the components in the dissociation product of water vapor, as a function of temperature;

FIGS. 2, 3, 4 and 5 are schematic representations of four embodiments of the invention;

FIGS. 6, 7 and 8 are schematic representations of three embodiments of an integrated process according to the invention for the production of hydrogen, oxygen and utilizable energy based on the process and apparatus shown in FIG. 2.

DESCRIPTION OF SPECIFIC EMBODIMENTS

Turning first to FIG. 1, it is seen that the thermal decomposition of water yields molecular hydrogen and oxygen as well as hydrogen, oxygen and hydroxyl radicals with the amount of such molecules and radicals increasing and the amount of water vapor decreasing with temperature. It follows that for effective thermal splitting of water the temperature has to be raised above 2000° K., and that for the recombination of oxygen and hydrogen to yield water in order to remove hydrogen from an oxygen rich product stream and oxygen from a hydrogen rich product stream, the temperature has to be lowered.

Turning now to FIG. 2 there is shown an apparatus comprising a first, reaction chamber 201 fitted with an aperture 202 and a transparent heat resistant window 203 for the admission of concentrated solar radiation. A second chamber 204 is separated from the reaction chamber 201 by a porous membrane 205 which is permeable preferentially to hydrogen in a Knudsen flow regime. A third chamber 206 is separated from the second chamber 204 by a porous membrane 207.

Ducting means 208 serve for the ingress of feed water into reaction chamber 201, ducting means 209 serve for the withdrawal of a first product gaseous mixture from reaction chamber 201, ducting means 210 serve for the withdrawal of a second product gaseous mixture from the second chamber 204, and ducting means 211 serve for the withdrawal of a third product gaseous mixture from the third chamber 206.

Catalyst beds 212 and 213 serve for the catalytic recombination of hydrogen and oxygen in the first and third product gaseous mixtures so as to produce, respectively, oxygen/water and hydrogen/water mixtures which are withdrawn via ducts 214 and 215, respectively.

A mixing injector 216 serves for pumping the second product gaseous mixture withdrawn via duct 210 with a jet of feed water arriving via duct 217 and the mixture is injected into the first chamber 201 via duct 208.

A heat exchanger 218 serves for the transfer of heat from the oxygen/water and hydrogen/water mixtures arriving via ducts 214 and 215, respectively, to feed water arriving via a duct 219 and the so preheated feed water is withdrawn from the heat exchanger 218 via a duct 217.

Ducts 221 and 222 lead from heat exchanger 218 to water traps 223 and 224, respectively, which serve for removing water from, respectively, the oxygen/water and hydrogen/water mixtures arriving from the heat exchanger 218 via ducts 221 and 222. A duct 225 serves for the withdrawal of essentially pure oxygen from trap 223 by means of a pump 226, and a duct 227 serves for the withdrawal of essentially pure hydrogen from trap 224 by means of a pump 228.

In operation, steam inside reaction chamber 201 is partly dissociated by the concentrated solar energy introduced via window 203 and aperture 202. Some of the thermal water splitting gaseous products produced inside the first, reaction chamber 201 passes by Knudsen diffusion into the second chamber 204 leaving behind an oxygen enriched mixture which is withdrawn from chamber 201 as first product gaseous mixture via duct 209 where it is cooled down. In the catalyst bed 212 the first product gaseous mixture is subjected to conditions under which hydrogen and oxygen combine into water and an oxygen/water mixture leaves catalyst bed 212 via duct 214.

Some of the gaseous mixture inside the second chamber 204 passes by Knudsen diffusion into the third chamber 206 and the remaining gaseous mixture is withdrawn via duct 210 into the mixing injector 216 where it is combined with feed water arriving via duct 217 and is injected via duct 208 into the first, reaction chamber 201.

In consequence of the two sequential Knudsen diffusions across membranes 205 and 207, the third product gaseous mixture withdrawn through duct 211 is enriched in hydrogen. On its way to the catalyst bed 213, this mixture is cooled down and inside the catalyst bed it is subjected to conditions inducive to the catalytic combination of hydrogen and oxygen into water and a hydrogen/water mixture is withdrawn via duct 215 and charged into the heat exchanger 218 concurrently with the oxygen/water mixture arriving via duct 214. Inside the heat exchanger 218 the two gaseous streams give off heat to the feed water arriving via duct 219 which is thereby converted into steam that is conducted into the mixing injector 216 where it entrains the second gaseous product mixture arriving from the second chamber 204 and injects it into the reaction chamber 201 as specified.

In the cooled oxygen/water and hydrogen/water mixtures withdrawn separately from heat exchanger 219 via ducts 221 and 222, respectively, the water is liquified and it is trapped inside traps 223 and 224 whereupon essentially pure oxygen is withdrawn via duct 225 by means of pump 226, and essentially pure hydrogen is withdrawn via duct 227 by means of pump 228.

The catalyst used to promote recombination of hydrogen and oxygen inside catalyst beds 212 and 213 cannot be used at very high temperature. In the embodiment of FIG. 2 the first and second product gaseous mixtures are cooled down by heat dissipation, convection, conduction and radiation from ducts 209 and 211. To this end, ducts 209 and 211 must be designed carefully in order to cool down the product gaseous mixtures which they conduct to a temperature low enough to be tolerated by the catalyst yet not too low to prevent the formation of a dangerous meta-stable mixture of hydrogen and oxygen in ducts 209 and 211.

Figure 3:
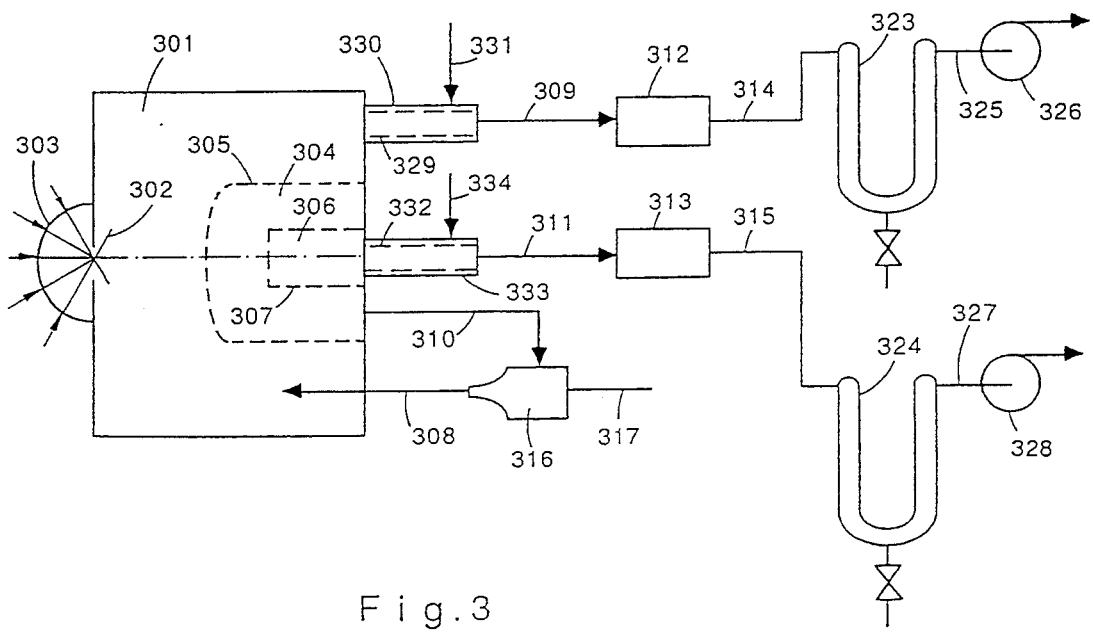
Figure 4:
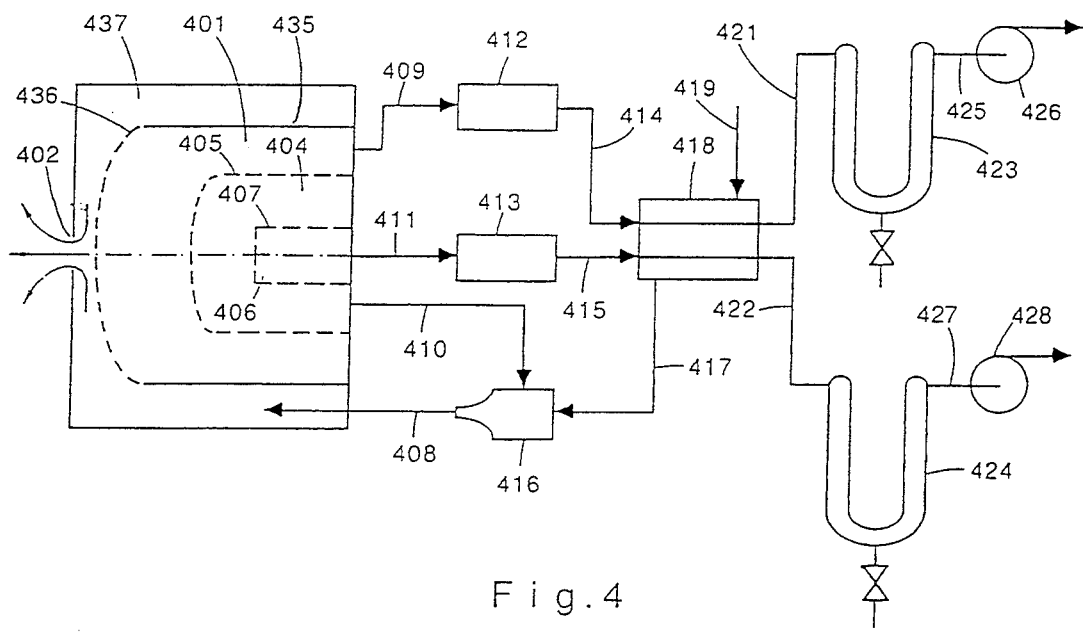

The second embodiment of the invention shown in FIG. 3 provides a very effective and safe means of withdrawing the said first and third product gaseous mixtures from the first and third chambers, respectively.

Essentially the embodiment of FIG. 3 is similar to the that of FIG. 2 and similar parts are designated by numerals of which the two last digits are as in FIG. 2 and the first digit "2" of FIG. 2 is replaced here by the digit "3". As shown, there is provided a first chamber 301 with an aperture 302 and a window 303; a second reaction chamber 304 which is separated from the first by a membrane capable of passing preferentially hydrogen in a Knudsen diffusion regime; and a third chamber 306 separated from the second chamber 304 by a similar preferentially hydrogen permeable membrane 307. As before, the first product gaseous mixture is withdrawn via a duct 309, charged into catalyst bed 312 from where it passes via duct 314 into a water trap 323 and essentially pure oxygen is withdrawn via a duct 325 by means of a pump 326. Also as before, the second gaseous product mixture is withdrawn from the second chamber 304 via a duct 310 and it is entrained in a mixing injector 316 by a jet of feed water arriving through a duct 317 and injected into the first, reaction chamber 301 via duct 308.

The third product gaseous mixture is withdrawn from the third chamber 306 via a duct 311, charged into the catalyst bed 313 and the resulting hydrogen/water mixture is fed via duct 315 into a water trap 324 from where essentially pure hydrogen is withdrawn via duct 327 by means of a pump 328.

The departure from the previous embodiment consists in the provision between the first chamber 301 and duct 309 of a porous ceramic tube 329 enclosed within a sleeve 330 fitted with a steam injector 331; and the provision of a similar porous ceramic tube 332 enclosed within a sleeve 333 fitted with a steam injector 334 between the third reaction chamber 306 and duct 311. In the course of operation, steam at relatively low temperature is injected into the sleeves 330 and 333 and penetrates into both ceramic tubes 329 and 332 where the injected steam mixes with the first and third product gaseous mixtures, respectively, whereby these mixtures are simultaneously cooled and diluted.

As shown, in accordance with this embodiment there is no need for heat exchanger and feed water which, if desired, may be preheated in any suitable fashion, is fed directly to the mixing injector 316.

The embodiment of FIG. 4 is again very similar to that of FIG. 2 and again the same components are designated by the same two last digits, while the first digit "2" of FIG. 2 is replaced here by the digit "4". The departure from FIG. 2 consists here in the provision of a partition 435 comprising a porous ceramic section 436 dividing the first chamber into an upstream compartment 437 and a downstream compartment 401 and forming a pressure barrier between the two. Steam is injected by injector 416 via duct 408 into the upstream compartment 437 and the injected steam flows via the porous membrane 436 into chamber 401 at a pressure slightly above atmospheric. A small fraction of the steam entering chamber 437 spills through aperture 402 to the outer atmosphere while the bulk of it diffuses through membrane 436 into the downstream compartment 401 of the first chamber. Due to the pressure drop across membrane 436, a low enough pressure is maintained in the downstream compartment 401 to obtain a Knudsen flow regime across membrane 405 into the second chamber 404 even though the pressure in front of membrane 436 is slightly above atmospheric. In consequence, the upstream compartment 437 does not have to be sealed off from the outside atmosphere and the need for a transparent window in front of the aperture 402, such as window 203 in FIG. 2 is obviated.

When a gas mixture of n components with molecular weights Mi and mol fractions Xi (i=1,2, ... ,n) diffuses from a compartment at a pressure p across a porous membrane into a vacuum under Knudsen flow conditions, a molar flowrate of species i across the membrane is given by the expression $$ni = CpXi/\sqrt{Mi}$$

Under practical conditions, however, there is a positive pressure p' on the downstream side of the membrane so that the net molar flowrate of species i across the membrane is obtained by accounting also for the back flow of species i under the influence of the partial pressure p'Xi' prevailing on the low pressure side of the membrane:

$$ni,\text{net} = (C/\sqrt{Mi})(pXi - p'Xi')$$

In order to obtain the high gas separation effect it is important to reduce the term p'Xi' in the last expression as much as possible.

Figure 5:
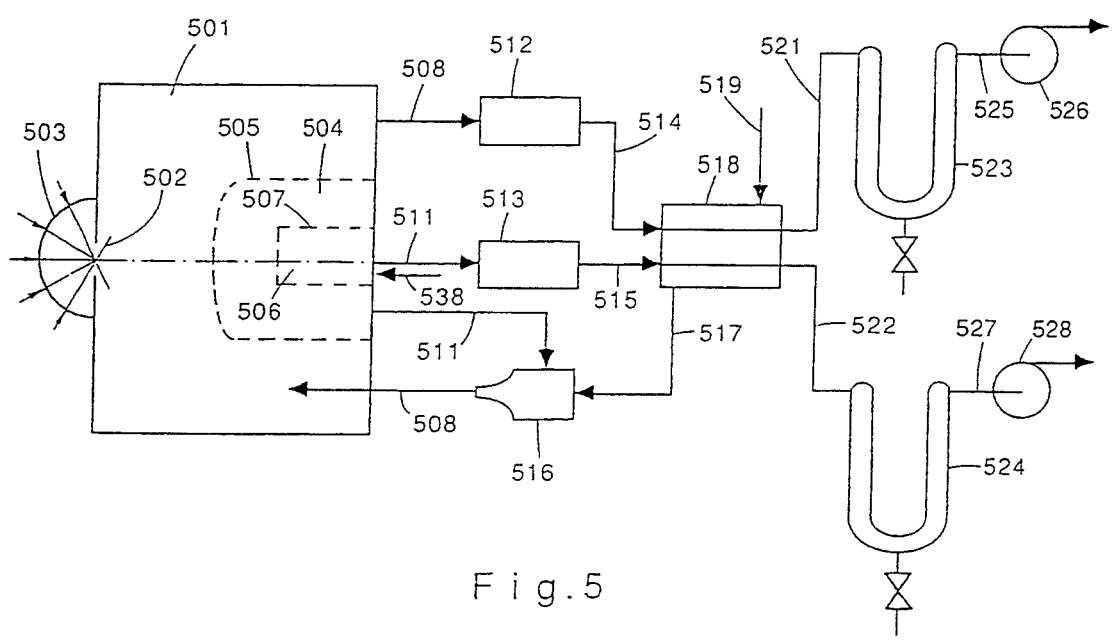

FIG. 5 illustrates a variant of the embodiment of FIG. 2 which has essentially the same design and similar parts are designated the same two last digits while the first digit "2" is replaced here by the digit "5". The only departure from FIG. 2 here is provision of water vapor injection means 538 by which the third product gaseous mixture is diluted whereby the term p'Xi' in the above formula is reduced, hydrogen back-flow from chamber 506 to chamber 504 is reduced and the gas separation effect is improved. For the rest this embodiment functions exactly as the one of FIG. 2.

By way of example, by diluting each tool of a gas mixture that reaches compartment 506 by a mol of water vapor, the mol fraction of each one of the water splitting products OH, H, O, $H_2$ and $O_2$ in chamber 506 is reduced to half its original value. The separation effectiveness of the diffusion process from the second chamber 504 to the third chamber 506 is thereby substantially improved.

It should be noted that the first product gaseous mixture leaving the first, chamber and the third product gaseous mixture leaving the third chamber are very hot and may have temperatures of above 2500° K. For practical reasons it is important to recover much of the enthalpy of these hot gas streams. FIGS. 6, 7 and 8 illustrate embodiments of the invention in which heat is recovered in an efficient way from the said first and third product gaseous mixtures and which thus are integrated processes for the production of hydrogen, oxygen and power or process heat.

Attention is first directed to FIG. 6. Similar as in previous embodiments, this embodiment comprises a first, reaction chamber 601 with an aperture 602 and a window 603 for the admission of concentrated solar energy, a second chamber 604 separated from the first chamber 601 by a ceramic membrane 605 preferentially permeable to hydrogen by Knudsen diffusion, and a third chamber 606 separated from the second chamber 604 by a similar membrane 607. The first product gaseous mixture discharged from the first chamber 601 via duct 609, is fed into a first mixing chamber 612 where it is mixed with water arriving from a reservoir 613 via duct 614 and 615 and flow restriction means 616 which are designed to adjust the pressure of the water flowing through it to the pressure prevailing in chamber 612 and to atomize the water ingressing the chamber in order to promote effective mixing therein. The gas mixture is withdrawn from chamber 612 via a duct 617 and flows across a heat exchanger 618 where it gives off heat to water to produce steam which is discharged at 619. The cool gas mixture leaving the heat exchanger 618 is led via duct 620 into a condenser 621 where all residual steam is condensed, the cooling water being withdrawn at 622. An oxygen/water mixture is withdrawn from condenser 621 via a duct 623 and is charged into a separation tower 624 where phase separation takes place and essentially pure oxygen is withdrawn from the top of chamber 624 via a duct 625 by means of a pump 626.

In a similar fashion the third product gaseous mixture emerging from chamber 606 via duct 611 is charged into a second mixing chamber 627 where it is mixed with water arriving from reservoir 613 via ducts 614 and 628 and flow restriction means 629 which are designed to adjust the pressure of water flowing through it to the pressure prevailing in chamber 627 and to atomize the water ingressing the chamber in order to promote effective mixing therein.

The gas mixture leaving mixing chamber 627 is conducted via duct 630 into a heat exchanger 631 where heat is given off to water to produce steam which is discharged at 632. The cooled gas mixture leaving heat exchanger 631 via duct 633 flows across a condenser 634 and the cooling water leaves at 635. The hydrogen/water mixture leaving condenser 634 is flown via duct 636 into a separation tower 637 where phase separation takes place and essentially pure hydrogen is withdrawn from the top of tower 637 via a duct 638 by means of a pump 639.

Water from towers 624 and 637 is withdrawn via ducts 640 and 641, respectively, and is injected by means of pumps 642 and 643 into the reservoir 613 which also receives fresh water via duct 644.

Feed water for the reaction chamber 601 is withdrawn from reservoir 613 via a duct 645 fitted with pressure reduction means 646 and is flown across a boiler 647. The hot water or steam emerging from boiler 647 is flown through a duct 648 into a mixing injector 649 where it is mixed with the second product gaseous mixture withdrawn from the second chamber 604 via duct 610 and entrains it into the first chamber 601 via duct 608.

Thus in accordance with this embodiment the separate recovery of oxygen and hydrogen obtained by direct water splitting in the first, reaction chamber 601 is accompanied by the production of steam which is delivered at 619 and 632 and may be utilizable as a heat source or for power production.

The embodiment of FIG. 7 is essentially similar to that of FIG. 6 and similar parts are designated with the same two last digits as in FIG. 6 while the first digit "6" of FIG. 6 is replaced here by the first digit "7". The departure here includes a heater 750 which receives feed water from reservoir 713 via duct 714 and flow restriction means 751, and the heated up feed water is fed via a duct 752 into a mixing injector 753 where it is mixed with the third product gas mixture arriving from the third chamber 706 via duct 711 and entrains it into mixing chamber 727 from where the process continues as in FIG. 6.

The embodiment of FIG. 8 is very similar to that of FIG. 7 and similar parts are again designated by the same two last digits while the first digit "7" of FIG. 6 is replaced here by the digit "8". In this embodiment the heater 750 of FIG. 7 is omitted and feed water arriving from reservoir 813 via duct 814 and flow restriction means 851 is led into jet injector device 853 where the water is mixed with the third product gas mixture arriving from the third chamber 806 via duct 811. From there on the process continues as in FIG. 6.

The action of the steam injector 753 in the embodiment of FIG. 7 and the liquid jet injector in the embodiment of FIG. 8 result in a pressure increase inside the mixing chambers 727 and 827, respectively, with a corresponding raise of the condensation temperature in condensers 734 and 834, which enables reduction of the condenser's size.

In the design of a plant in accordance with the embodiment of the invention shown in FIG. 6 the following parameters apply:

| | |
|---|---|
| Solar reactor operating temperature | $T601 = 2527°$ C. |
| Temperature of steam entering | $T609 = 144°$ C. |
| Temperature in mixing chambers | $T612 = T627 = 1400°$ C. |
| Temperature in reservoir 613 | $T613 = 30°$ C. |
| Pressure in the first chamber 601 | $p601 = 0.20$ atm |
| Pressure in the second chamber 604 | $p604 = 0.13$ atm |
| Pressure in the third chamber 606 | $p606 = 0.06$ atm |
| Pressure of steam from injector 648 | $p648 = 4.0$ atm |
| Mass flowrate to the first, reaction chamber 601 | $W608 = 1862$ g/sec |
| Flowrate of gas bypassing membrane 605 | $W609 = 0.125\ W608$ |
| Flowrate of gas leaving the third chamber 606 | $W611 = 0.125\ W608$ |
| Injector 649 mass flow ratio | $W648/W610 = 0.33$ |
| Recirculation mass flow ratio | $W610/W608 = 0.75$ |
| Rate of solar energy entering aperture 602 | $Q_{in},602 = 6.24$ MW |
| Rate of heat input to boiler 647 | $Q_{in},647 = 1.22$ MW |
| Rate of heat recovery in heat exchangers 618 and 631 | $Q = 4.87$ MW |
| Rate of hydrogen production | $W639 = 11.3$ g/sec |

Assuming a solar collector efficiency of $\eta c=0.58$, a solar receiver efficiency $\eta R=0.85$, that the hydrogen is used in a fuel cell to produce electricity with an efficiency $\eta f.c=0.6$ and that the heat recovered is converted to electricity in a compound power cycle with an efficiency $\eta c.c=0.55$, the plant will convert solar energy into electricity with an overall efficiency $\eta=0.202$.

The above example illustrates the usefulness of the invention in one specific installation. The hydrogen and oxygen produced and the heat recovered in a system based on the disclosed invention can of course be used also for other purposes than the production of electricity.

I claim:

1. A method of direct thermal splitting of water and separate recovery of oxygen and hydrogen from the resulting hot gaseous decomposition mixture, comprising:
   (i) providing first, second and third chambers arranged in series and separated from each other by membranes that are preferentially permeable to hydrogen in a Knudsen flow regime:
   (ii) injecting a jet of feed water into said first chamber and inducing a direct splitting of water to occur therein whereby said hot gaseous decomposition mixture is obtained;
   (iii) passing part of said hot gaseous decomposition mixture from said first chamber to said second chamber by diffusion across one of said membranes preferentially permeable to hydrogen in a Knudsen flow regime separating the two chambers, whereby a first product gaseous mixture enriched in oxygen is obtained in said first chamber and a second product gaseous mixture is obtained in said second chamber;
   (iv) withdrawing said first product gaseous mixture from said first chamber;
   (v) passing part of said second product gaseous mixture from said second chamber into said third chamber by diffusion across one of said membranes preferentially permeable to hydrogen in a Knudsen flow regime separating the two chambers, withdrawing the remaining second product gaseous mixture and recycling it through entrainment by said jet of feed water to said first chamber;
   (vi) withdrawing a third gaseous product mixture enriched in hydrogen from said third chamber;
   (vii) allowing said first and third product gaseous mixture to cool to a temperature at which hydrogen and oxygen combine to form water, inducing such combination to occur and withdrawing water from the resulting oxygen/water and hydrogen/water mixtures; and
   (viii) separately recovering oxygen and hydrogen.

2. A method according to claim 1, wherein said first and third product gaseous mixtures are cooled and then passed each through a catalyst bed to produce oxygen/water and hydrogen/water mixtures.

3. A method according to claim 2, wherein said oxygen/water and hydrogen/water mixtures are subjected to heat exchange with feed water whereby the feed water is heated.

4. A method according to claim 3, wherein the heated feed water is mixed with said recycled second product gaseous mixture.

5. A method according to claim 2, wherein steam is injected into each of said first and third product gaseous mixtures before they are introduced into the said catalyst beds.

6. A method according to claim 1, wherein steam is injected into said third chamber.

7. A method according to claim 1, wherein the thermal splitting of water in said first chamber is induced by solar radiation concentrated to a degree sufficient to raise the temperature inside said first chamber to above 2000° K.

8. A method according to claim 7, wherein said concentrated solar radiation is admitted into said first chamber through a transparent, heat resistant window.

9. A method according to claim 7, wherein said first chamber is divided by a porous ceramic membrane into upstream and downstream compartments, feed water and recycled second product gaseous mixture are injected into the upstream compartment and said concentrated solar radiation is admitted into the upstream compartment through an aperture thereof whereby hot steam permeates as feed into the downstream compartment.

10. A method according to claim 1 for the simultaneous production of oxygen, hydrogen and utilizable heat, wherein said first and third product gaseous mixtures are fed into first and second mixing chambers, respectively, and are mixed with water, heat is recovered from the gas streams leaving said first and second mixing chambers and the remaining oxygen/water and hydrogen/water mixtures are processed for the separate recovery of oxygen and hydrogen.

11. A method according to claim 10, wherein said third product gaseous mixture is entrained by steam or water and injected into said second mixing chamber jet action.

* * * * *